United States Patent
Richardson

(10) Patent No.: US 6,647,166 B2
(45) Date of Patent: Nov. 11, 2003

(54) ELECTROCHROMIC MATERIALS, DEVICES AND PROCESS OF MAKING

(75) Inventor: Thomas J. Richardson, Oakland, CA (US)

(73) Assignee: The Regents of the University of California, Oakland, CA (US)

(*) Notice: Subject to any disclaimer, the term of this patent is extended or adjusted under 35 U.S.C. 154(b) by 28 days.

(21) Appl. No.: 09/901,969

(22) Filed: Jul. 9, 2001

(65) Prior Publication Data

US 2002/0044717 A1 Apr. 18, 2002

Related U.S. Application Data

(60) Provisional application No. 60/226,244, filed on Aug. 17, 2000.

(51) Int. Cl.$^7$ .................................. G02B 6/26
(52) U.S. Cl. ........................... 385/16; 385/18
(58) Field of Search ............... 385/16–23, 24; 359/124, 127, 128

(56) References Cited

U.S. PATENT DOCUMENTS

| | | | |
|---|---|---|---|
| 3,521,941 A | * 7/1970 | Deb et al. ............... 359/275 |
| 4,139,275 A | * 2/1979 | Yano et al. ............. 359/270 |
| 4,293,194 A | 10/1981 | Takahashi |
| 4,375,319 A | * 3/1983 | Wada et al. ............ 359/267 |
| 4,421,985 A | * 12/1983 | Billingsley et al. ...... 250/353 |
| 4,524,385 A | * 6/1985 | Billingsley et al. ...... 348/164 |
| 4,830,471 A | 5/1989 | Demiryont |
| 4,960,324 A | * 10/1990 | Brown .................. 359/265 |
| 5,066,111 A | 11/1991 | Singleton et al. |
| 5,124,832 A | 6/1992 | Greenberg et al. |
| 5,177,628 A | * 1/1993 | Moddel .................. 349/28 |
| 5,209,980 A | 5/1993 | Spindler |
| 5,215,821 A | 6/1993 | Ho |
| 5,327,281 A | 7/1994 | Cogan et al. |
| 5,471,338 A | 11/1995 | Yu et al. |
| 5,471,554 A | 11/1995 | Rukavina et al. |
| 5,520,851 A | 5/1996 | Yu et al. |
| 5,585,959 A | 12/1996 | Brown et al. |
| 5,618,390 A | 4/1997 | Yu et al. |
| 5,635,729 A | 6/1997 | Griessen et al. |
| 5,657,150 A | 8/1997 | Kallman et al. |
| 5,777,780 A | 7/1998 | Terada et al. |
| 5,793,518 A | 8/1998 | Lefrou et al. |
| 5,798,860 A | 8/1998 | Yu et al. |
| 5,831,760 A | 11/1998 | Hashimoto et al. |
| 5,849,415 A | 12/1998 | Shalaby et al. |
| 5,905,590 A | * 5/1999 | Van Der Sluis et al. .... 359/265 |
| 5,916,398 A | 6/1999 | Coleman et al. |
| 5,953,150 A | 9/1999 | Smarto et al. |
| 5,969,847 A | 10/1999 | Coleman et al. |
| 5,970,187 A | * 10/1999 | Notten et al. ........... 385/16 |
| 5,973,818 A | 10/1999 | Sjursen et al. |
| 5,973,819 A | 10/1999 | Pletcher et al. |
| 5,978,126 A | 11/1999 | Sjursen |
| 5,995,273 A | 11/1999 | Chandrasekhar |
| 6,006,582 A | * 12/1999 | Bhandari et al. ........ 257/2 |
| 6,010,220 A | 1/2000 | Smarto |
| 6,033,518 A | 3/2000 | Backfisch |
| 6,047,107 A | * 4/2000 | Roozeboom et al. ..... 392/416 |
| 6,066,269 A | 5/2000 | Wei et al. |
| 6,067,184 A | 5/2000 | Bonhote et al. |
| 6,091,184 A | 7/2000 | De Vries |
| 6,099,117 A | 8/2000 | Gregory |
| 6,101,298 A | * 8/2000 | Den Broeder et al. ...... 385/16 |
| 6,110,016 A | 8/2000 | Coleman et al. |
| 6,118,572 A | 9/2000 | Kostecki et al. |
| 6,120,696 A | 9/2000 | Armand et al. |
| 6,127,516 A | 10/2000 | Bard et al. |
| 6,136,161 A | 10/2000 | Yu et al. |
| 6,163,926 A | 12/2000 | Watanabe |
| 6,165,547 A | 12/2000 | Leedom |
| 6,165,643 A | 12/2000 | Doyle et al. |
| 6,166,849 A | 12/2000 | Coleman et al. |
| 6,173,116 B1 | * 1/2001 | Roozeboom et al. ...... 118/724 |
| 6,185,034 B1 | 2/2001 | Nakamura et al. |
| 6,198,225 B1 | * 3/2001 | Kano et al. ............ 315/169.3 |
| 6,211,995 B1 | 4/2001 | Azens et al. |
| 6,213,602 B1 | 4/2001 | Smarto |
| 6,214,261 B1 | 4/2001 | Smarto et al. |
| 6,232,782 B1 | * 5/2001 | Kacprowicz et al. ...... 324/435 |
| 6,259,549 B1 | * 7/2001 | Leupolz et al. ......... 359/270 |
| 6,265,222 B1 | * 7/2001 | DiMeo et al. .......... 436/144 |
| 6,291,096 B1 | * 9/2001 | Klein ................... 429/90 |
| 6,310,725 B1 | * 10/2001 | Duine et al. ........... 359/585 |
| 6,317,531 B1 | * 11/2001 | Chen et al. ............ 385/17 |
| 6,356,376 B1 | 3/2002 | Tonar et al. |
| 6,383,956 B2 | * 5/2002 | Hawryluk et al. ........ 438/795 |
| 6,395,350 B1 | * 5/2002 | Balkus et al. .......... 427/556 |
| 6,437,900 B1 | * 8/2002 | Cornelissen et al. ..... 359/246 |
| 6,495,390 B2 | * 12/2002 | Hawryluk et al. ........ 438/56 |
| 2002/0154535 A1 | * 10/2002 | Bocian et al. .......... 365/151 |
| 2002/0160270 A1 | * 10/2002 | Bronstert et al. ....... 429/309 |

* cited by examiner

Primary Examiner—Akm E. Ullah
Assistant Examiner—Michelle R. Connelly-Cushwa
(74) Attorney, Agent, or Firm—Charles R. Nold

(57) ABSTRACT

Thin films of transition metal compositions formed with magnesium that are metals, alloys, hydrides or mixtures of alloys, metals and/or hydrides exhibit reversible color changes on application of electric current or hydrogen. Thin films of these materials are suitable for optical switching elements, thin film displays, sun roofs, rear-view mirrors and architectural glass.

14 Claims, No Drawings

ELECTROCHROMIC MATERIALS, DEVICES AND PROCESS OF MAKING

CROSS REFERENCE TO RELATED APPLICATIONS

This applications claims priority to U.S. Ser. No. 60/226,244, filed Aug. 17, 2000, the contents which are hereby incorporated by reference in their entirety.

STATEMENT REGARDING FEDERALLY SPONSORED RESEARCH OR DEVELOPMENT

The invention described and claimed herein was made in part utilizing funds supplied by the United States Department of Energy under contract No. DE-AC03-76SF000-98 between the U.S. Department of Energy and the Regents of the University of California. The government has certain rights to the invention.

BACKGROUND OF THE INVENTION

Devices capable of switching between mirror-like and transparent states find many applications in architectural and transportation energy conservation, lighting and displays, aerospace insulation control, and optical communications systems. Such devices, termed "switchable mirrors", based on rare earth hydrides were discovered by Huiberts et al., *Nature* 380, 231 (1996), who observed a reversible metal-to-insulator transition when a thin film (150 to 500 nm) of yttrium or lanthanum coated with a thin layer of palladium was exposed to hydrogen gas. The transition accompanies conversion of a metallic dihydride phase to a semiconducting trihydride. Rare earth-magnesium alloy films were subsequently found to be superior to the pure lanthanides in maximum transparency and mirror-state reflectivity, see Van der Sluis et al., *Appl. Phys. Lett.* 70, 3356 (1997).

Phase separation appears to occur when these alloys take up hydrogen, giving transparent $MgH_2$ and $LnH_{2-3}$, both of which may participate in the switching mechanism. Because the rare earths are highly vulnerable to oxidation, a Pd overlayer at least 5 nm thick is required for films exposed to air or to an alkaline electrolyte. Although the Pd catalyzes the uptake and removal of hydrogen, it limits the maximum transparency of the composite film to about 50%.

Other fields of art have developed materials that exhibit electrochromism. Among the many transition metals and alloys that have been investigated for use in low pressure hydrogen storage devices or as electrodes in secondary batteries, a few are known to form semiconducting hydride phases such as $Mg_2NiH_4$, $Mg_2CoH_5$, and $Mg_2FeH_6$, see Reilly et al., *Inorg. Chem.* 7, 2254, (1968); Zolliker et al., *Inorg. Chem.*, 24, 4177, (1985) and Didisheim et al., *Inorg. Chem.*, 23, 1953, (1984).

BRIEF SUMMARY OF THE INVENTION

Electrochromism is a term used to describe a reversible change of color exhibited by some materials when placed in an electric field. Some materials can exhibit a mirror-like state when no electric field is present, and change to a transparent state when an electric field is applied, and vice versa. By laminating thin films of electrochromic materials between electrodes, an electrochromic device is created, also termed a "switchable mirror" or "switching device". Switchable mirrors may also be created by laminating the materials disclosed herein and applying a hydrogen source to the film. Upon the application of hydrogen the materials exhibit a change to a colored/transparent state. Removing the hydrogen cause the materials to switch back to their mirror-like state.

A new class of switchable mirrors based on novel electrochromic materials has been discovered. The rapid, reversible conversion from the highly reflecting metallic state to a transparent semiconducting state can be produced by either electrochromic or gasochromic means.

This invention contemplates transition metal compositions that are useful as electrochromic materials. Generally, these transition metal compositions are transition metal compositions formed with magnesium, i.e. which include magnesium. These compositions may be metals, alloys, hydrides or mixtures of alloys, metals and/or hydrides. Further contemplated by this invention are ternary combinations of two transition metals and magnesium. Examples are: $Ni_xCo_{1-x}Mg_y$ (with $0<x<1$, and $2<y<12$, preferably $3<y<8$), or others containing first row transition metal elements Zn, Cu, Ni, Go, Fe, Mn, Cr, V, Ti, Sc. Further examples of ternary combinations of two transition metals and magnesium include transition metal alloys FeTi, VTi, $NiTi_2$, $NiZr_2$, Nb and Ta alloys; also contemplated are hydrides containing Ca, Sr, Ba, Li, Na, Mg, K or Rb with any second or third row transition metal. The latter are known to undergo metal to insulator transitions when the hydrides are formed from the metal alloys or mixtures. Among the materials contemplated for the instant invention are those known to form semiconducting hydride phases such as transition metal alloys FeTi, VTi, $NiTi_2$, $NiZr_2$, Nb and Ta alloys.

The electrochromic materials disclosed in this invention are more resistant to oxidation and are more highly reflecting in the metallic state than are the rare earth compounds of previous electrochromic materials.

DETAILED DESCRIPTION OF THE PREFERRED EMBODIMENTS

This invention contemplates materials that will optically switch upon the application of both electric current and hydrogen gas. It is contemplated that the materials described herein be used in electrochromic or gasochromic devices. As used herein the terms gasochromic is meant to apply to electrochromic, and vice versa. As used herein the term "switching device" is meant to include a device capable of exhibiting a change of light transmission in response to either an applied electric current or a hydrogen source. A "switching film" is a film of materials described herein that undergo a reversible change in light transmittance.

The hydrogen may be applied by those techniques known in the art. Hydrogen gas is preferred, but hydrogen may also be supplied by a plasma or from another metal hydride, for example metal alloys used for hydrogen storage.

An electrochromic device contemplated by this invention can be produced to appear in its transparent, uncolored state (enabling one to see through the device), or in it's mirror-like state. By way of example, a Ni—Mg film as deposited will appear reflective and mirror-like. Upon application of a suitable means to allow electron flow in device, or alternatively upon the provision of a hydrogen source to the Ni—Mg film, a metal-to semiconductor transition takes place, and the film becomes transparent. Examples of electrochromic or gasochromic devices are those structures capable of providing a $H_2$ source or means to provide for electron flow. Electrochromic devices suitable for this purpose are well known. In such devices, a film of an electrochromic material is layered between electrodes. Gasochromic devices have films comprising materials that switch reversibly between a transparent state and mirror-like state upon the application and removal of a hydrogen source, usually hydrogen gas.

Devices suitable for use with this invention include, but are not limited to, those devices disclosed in the following U.S. Pat. Nos., the contents of which are hereby incorporated by reference in their entirety: 6,211,995; 5,970,187; 5,831,760; 5,793,518; 5,777,780; 4,830,471 and 4,293,194.

Also suitable for use with this invention are switching devices employing hydrogen gas such as those described in U.S. Pat. Nos. 6,101,298; 5,905,590 and 5,635,729, the contents of which are hereby incorporated by reference in their entirety.

Materials described herein exhibit reversible color changes on application of electric current or hydrogen gas. Thin films of these materials are suitable for optical switching elements, thin film displays, sun roofs, rear-view mirrors and architectural glass.

exposure to a hydrogen source the alloy forms a ternary hydride, $Mg_2CoH_5$. Cu is deposited as an alloy with Mg. Upon exposure to a hydrogen source, no ternary hydride is formed. Instead, $MgH_2$ and $CuH_x$ are formed.

Pt and Pd form an alloy with Mg but not a ternary hydride.

Not forming an alloy with Mg upon deposition are Fe, Mn, Ti and V, Table 1.

Further contemplated by this invention are ternary combinations of two transition metals and magnesium. Examples are: $Ni_xCo_{1-x}Mg$, or others containing first row transition metal elements Zn, Cu, Ni, Co, Fe, Mn, Cr, V, Ti, Sc. Further examples of ternary combinations of two transition metals and magnesium include transition metal alloys $Fe_xTi_{1-x}$ (0<x<1), $V_xTi_{1-x}$ (0<x<1), $NiTi_2$, $NiZr_2$. The ternary transition metal alloys and magnesium must be magnesium rich. Nb and Ta alloys with Mg or mixtures thereof are also contemplated.

TABLE 1

Transition metal - magnesium switchable mirror compositions.

|  | Forms ternary Mg hydride | No ternary hydride |
| --- | --- | --- |
| Forms alloy with Mg | Ni ($Mg_2Ni \Leftrightarrow Mg_2NiH_4$)<br>Co ($Mg_2Co \Leftrightarrow Mg_2CoH_5$) | Cu ($Mg_2Cu \Leftrightarrow MgH_2$, $CuH_x$) |
| No alloy with Mg | Fe ($Mg_2FeH_6$)<br>Mn ($Mg_3MnH_7$) | Ti ($MgH_2$, $TiH_2$)<br>V ($MgH_2$, $VH_2$)<br>Cr ($MgH_2$, $CrH_2$) |

As used herein "first row transition metals" include Sc, Ti, V, Cr, Mn, Fe, Co, Ni, Cu and Zn. "Second row transition metals" include Y, Zr, Nb, Mo, Tc, Ru, Rh, Pd, Ag and Cd. "Third row transition metals" include La, Hf, Ta, W, Re, Os, Ir, Pt, Au and Hg.

Preferably the transition metal compositions contemplated herein are transition metal compositions formed with magnesium, i.e. which include magnesium. As used herein "transition metal composition" means metals, alloys, hydrides or mixtures of metals, alloys and/or hydrides. These include those known to form semiconducting hydride phases such as $Mg_2NiH_4$, $Mg_2CoH_5$, $Mg_2FeH_6$, $FeTiH_2$ and $Zr_2NiH_5$. As non-limiting examples, the transition metals that form alloys with Mg upon deposition are Ni, Co and Cu, Table 1. These metals are deposited as Ni—Mg, Co—Mg and Cu—Mg alloys respectively. By way of example, a Ni—Mg film is deposited with an excess of Mg to provide a film containing $Mg_2Ni$ alloy with elemental Mg. All Mg alloys contemplated for switching films herein are Mg rich, having stoichiometric ratios that will exhibit switching at a Mg/(Ni, Co or Cu) ratio of 2/1 to 13/1, preferred are 3/1 to 12/1. The range is variable, and also process dependent with temperature, pressure, film thickness and Pd overlayer thickness all forming parameters for optimizing the switching of materials described herein. These films are mirror-like if deposited in the alloy form.

By "which includes magnesium" is meant to mean transition metal compositions that are alloyed, bonded, mixed, or dissolved with magnesium.

"Ternary compositions" as described herein include metals, alloys, hydrides or mixtures of alloys, metals and/or hydrides.

$Mg_2Ni$ may be deposited as an alloy. Upon exposure to a hydrogen source the alloy forms a ternary hydride, $Mg_2NiH_4$. Co is deposited as an alloy with Mg. Upon Also contemplated for switching films are hydrides containing Ca, Sr, Ba, Li, Na, Mg, K or Rb with any second or third row transition metal. The latter are known to undergo metal to insulator transitions when the hydrides are formed from the metal alloys or mixtures. Non-limiting examples are ternary complexes of Ca, H and either Ir, Ru or Rh, which form $Ca_2IrH_5$, $Ca_2RuH_6$ and $Ca_2RhH_5$; or Sr, H and either Ir, Ru or Rh which form $Sr_2IrH_5$, $Sr_2RuH_6$ and $Sr_2RhH_5$. Fe, Ru and Os ternary hydrides are disclosed in Zeitschrift fur Physikalische Chemie, Vol. 181, P. 535–541, (1993), the contents of which are incorporated by reference in their entirety.

Also contemplated by this invention are novel electrochromic materials comprising elemental mixtures, alloys or solutions of the following systems: Mn—Mg, Ti—Mg, Cu—Mg, Ni(7% V)-Mg, Fe—Mg and pure Ti or pure V. By pure Ti or pure V, a target is 99.999% pure or greater. All of these compositions are found to be magnesium rich. The stoichiometric ratio for a Mn—Mg composition would be Mg/Mn ratio of about 2/1 to about 13/1, preferably about 3/1 to 12/1. For a Ti-Mg system, a Mg/Ti ratio would be about 2/1 to about 7/1, preferably about 3/1 to about 6/1. For a Cu—Mg system, a Mg/Cu ratio would be about 3/1 to about 7/1, preferably about 4/1 to about 6/1. For a Ni(7%V)-Mg system a Mg/Ni ratio would be about 4/1 to about 10/1. For a Fe—Mg system, a Mg/Fe ratio would be about 2/1 to about 12/1.

By way of example, when a Mn—Mg composition is exposed to a hydrogen source, $MgH_2$ and $Mg_3MnH_7$ are produced.

To the compositions contemplated as electrochromic materials a small amount of Ti, Zr, Ca and Mg may optionally be added as hydrogen adsorption elements for further increasing the hydrogen adsorption capacity of the nickel-metal-hydride alloy; or a part of Ni is replaced by Co, Mn, Al, or 1 to 2 kinds of M elements (M represents V, Cr, Fe, W, Mo, Nb, B, Si, Sn, Zn, N ) are added for improving anti-corrosion, cycling life and related comprehensive properties of the nickel-metal-hydride alloy.

Ni—Mg electrochromic devices are constructed as follows: a Ni—Mg composite film is deposited on a glass substrate by vacuum sputtering. The film may be 15 to 5000 nm thick. A separate, thin Pd overlayer (0.1 nm to 20 nm, preferably about less than 5 nm) may also be deposited. An advantage to the invention described herein is that a thinner Pd layer may be applied compared to previous electrochromic devices. As deposited above, the Ni—Mg film is mirror-like and reflecting, with very low visible transmittance. On exposure to hydrogen gas, a metal-to-semiconductor transition takes place, and the film becomes transparent. When the source of hydrogen is removed, or the sample is exposed to air or other oxidizing agent, the transparent film loses hydrogen and returns to the metallic state. Switching may also be achieved electrochemically by those techniques known in the art.

The electrochromic materials disclosed in this invention are more resistant to oxidation and are more highly reflecting in the metallic state than are the rare earth compounds of previous electrochromic materials. The nickel magnesium and nickel cobalt films described herein are much less reactive and can be handled and stored in air before use without a Pd coating. While a thin film of Pd can improve the rate of switching in these films, it does not have to completely cover the film and therefore has less of a limiting effect on their performance. The Ni—Mg films are less expensive and more stable than those containing rare earths.

DC magnetron sputtering is a suitable deposition method for most types of metals. Other variants of sputtering will also produce similar results, such as rf sputtering, ac sputtering, plasma-assisted sputtering. Evaporation methods also will produce films of the required properties. It is contemplated that sputtering from a single target with mixed reactants is also suitable. Any form of film deposition should be suitable for the formation of electrochromic films of the materials described herein. CVD is also a suitable candidate.

Some depositions were carried out using cosputtering from two metal targets, Ni and Mg or Co and Mg, simultaneously. This particular variant of sputtering allows one to vary the composition of the films by changing the relative power to the two sputtering sources. Combinatorial synthesis techniques used together with masking could produce many variations in a single sputtering run.

Films made of the materials described herein may also contain concentration gradients, and are so contemplated depending on their desired end use. For example it is contemplated that gradients in film thickness normal to the film surface be present so as to isolate the switching compounds from the surface. Films of the materials described herein may comprise two or more thin films of said materials. The materials may be doped with up to a few atom percent of another element to affect the color or electrical conductivity of the resulting device.

The technique described herein for Ni and Co magnesium films is generally equally applicable to all electrochromic materials described herein.

Films were deposited by DC magnetron co-sputtering using 2" diameter Ni, Mg (99.98%) and Co (99.95%) targets on AJA 2" sputter sources. The sources were inclined 23 degrees off normal, with a common focal point 10.25 cm above the centerline plane of the targets. Deposition occurred in a cylindrical vacuum chamber of dimensions 24" wide by 14" high. The system was maintained at high vacuum by a CTI Cryo-Torr 8 cryo pump.

ITO, Tech 15, and borosilicate glass were used as substrates for the NiMg and CoMg thin films. Substrates were ultrasonically cleaned in acetone and then isopropyl alcohol. Then were dried in a stream of dry $N_2$, and then placed in the chamber load lock. They were heated to approximately 100 degrees Celsius in the load lock. The final surface cleaning occurred in the main chamber, where a plasma etch process was applied for 90 seconds, running a 50 mA current at 1 kv to a commercial plasma cleaning source. Argon was fed to the plasma cleaning source at a flow rate of 19 sccm.

The base pressure for the Ni Mg/Pd depositions ranged between $1.2 \times 10^{-7}$ and $1.4 \times 10^{-7}$ Torr. For the CoMg depositions, the base pressure was between $2.4 \times 10^{-7}$ and $2.7 \times 10^{-7}$ Torr. The process pressure for the NiMg depositions was 2 mTorr. CoMg depositions were done at both 2 and 10 mTorr. Research grade Ar (99.9995%) was used as the sputter gas, with a flow rate of 165 sccm. Cyro pump conductance was maintained at 100%. Power to the Ni source was 20 watts, power to the Mg source was 22 watts, and power to the Co source was 32 watts. The target to substrate distance for all depositions was 7.5 cm. Deposition rates ranged from 3.3 to 5.5 Angstroms/second, depending on the location of a given substrate in the horizontal plane over the sputter sources. When a Pd over-layer was applied, it was deposited at 10 mTorr process pressure, with 100 sccm Ar flow, and a throttled down cryo pump conductance. Pd power was 12.4 watts, with a deposition rate of approximately 1.6 Angstroms/second.

During deposition typical powers which were used include: CoMg: 32 W Co, 23 W Mg; FeMg: 29 W Fe, 36 W Mg; MnMg: 15 W Mn, 40 W Mg; TiMg: 45 W Ti, 40 W Mg; Ti alone: 45 W.

The switching film in accordance with this invention has a thickness in the range of between 15 and 5000 nm. A thinner or thicker film layer will lead to different switching times due to the diffusion time for hydrogen gas through the switching film.

Switching from the as-deposited mirror state to the transparent state was achieved by exposing the films to a dry gas stream containing 4% hydrogen in argon or helium. Upon removal from the deposition chamber, films were checked for optical transmittance modulation within the visible range using a gas phase apparatus. Films were placed coated side down on backlit stage with a 2.2 cm aperture. Compressed air or Hydrogen gas (4%, balance Ar) could be directed to flow over the active surface of the film. After placing the film on the stage, gas flow was switched to the 4% $H_2$ supply, and watched for any obvious changes in optical transmittance. In some cases, an International Light 1700 radiometer and associated SED033 detector (with W#7556 filter and Y#16356 diffuser) was used to quantify the change in optical transmittance upon $H_2$ exposure.

The NiMg films were observed to switch rapidly, with the change immediately noticeable upon introduction of $H_2$ gas, and the complete range of switching observed (to the eye) within approximately 30 seconds. These films were observed (to the eye) to begin switching back to their metallic state within 5 seconds of turning off the $H_2$ supply, with a full return to the metallic state appearing to be complete within a minute or two.

The CoMg films were slower to switch, with first evidence of modulation appearing (to the eye) after approximately 4 seconds, and attainment of the most transparent state taking approximately two minutes. Return to the metallic state was slower than for the NiMg films, appearing to take 5 to 15 minutes. Subsequent switching cycles of a given film appeared to occur more rapidly than the first cycle.

Electrochemical switching was performed using the sample, prepared as above, as the working electrode of an electrochemical cell. A counter electrode may be platinum foil, nickel hydroxide, or other electrode stable in the alkaline electrolyte (0.01 to 10 M KOH). An HgO/Hg reference electrode may be used, or a Pt foil may be used as a psuedo-reference electrode. When the working electrode is polarized to about −1.0 V below the standard hydrogen electrode (SHE) potential, hydrogen insertion begins, forming hydride compounds of Ni, Mg, or Ni—Mg alloys. The metal-to-semiconductor transition takes place, and the film becomes transparent. On anodic polarization to about −0.2 V vs. SHE, the hydrogen is removed and the metallic, mirror character returns.

In the case of nickel, a stoichiometric alloy phase, $Mg_2Ni$, with the same Mg—Ni ratio as in the hydride, can be prepared from the elements. In $Mg_2Ni$ there are Ni—Ni bonds two types of Ni—Mg bonds and three types of Mg—Mg bonds. The Ni—Ni bonds and Mg—Mg bonds are shorter in the alloy than in the pure elements. The alloy absorbs hydrogen without structural rearrangement up to a composition of $Mg_2NiH_{0.3}$. This phase has metallic properties similar to those of the pure alloy. Further introduction of hydrogen produces $Mg_2NiH_4$. In this material each nickel atom is surrounded by four hydrogen atoms in a tetrahedral array, with short Ni—H bond lengths and Mg—H bonds slightly longer than those in magnesium hydride ($MgH_2$). No Ni—Mg bonds remain. $Mg_2NiH_4$ is a red solid. Its optical bandgap has been reported variously as 2.0, 1.9, 1.7 eV for bulk samples, and 1.3 eV for a Ni—Mg—H film of unknown composition. $MgH_2$ is a colorless insulator, $E_g$=5.16 eV. Although the bulk hydrides are generally prepared at elevated temperature and pressure, the $H_2$ dissociation pressures at 25° C. are ca. $1 \times 10^{-5}$ atm for $Mg_2NiH_4$[7] and $1 \times 10^{-6}$ atm for $MgH_2$.

The freshly deposited Ni—Mg films were amorphous by X-ray diffraction (XRD), showing only weak reflections due to Pd. After annealing in dry nitrogen at 125° C., $Mg_2Ni$, Mg, and $Mg_6Pd$ were present. The annealed films did not take up hydrogen readily, and no changes were observed in the XRD pattern obtained under a stream of 4% $H_2$. All Ni—Mg films were highly reflecting and had very low transmittance. The transition speed and maximum transmittance depended upon the Ni to Mg ratio. Films without a Pd overlayer switched very slowly and less completely. Gasochromic switching times of less than 10 s were achieved. Cosputtering from offset sources produced films with position-dependent Ni—Mg atomic ratios. RBS-PIXE analysis showed that areas with Mg:Ni atomic ratios between 4.5:1 and 7:1 became transparent on the first exposure to $H_2$. On subsequent hydriding following air oxidation, the area of switching expanded to include Mg:Ni ratios from 3.5:1 to 10:1. The color of thick transparent films varied from pale yellow in Mg-rich regions to deep red in Ni-rich areas. The absorption edge of $Mg_2NiH_4$ is shifted to shorter wavelengths by the presence of $MgH_2$, as in the case of rare earth-Mg hydride mixtures. The estimated optical bandgap varied from 2.8 eV for films containing a large excess of Mg to about 2.5 eV for Mg:Ni~4.

Electrochemical hydrogen loading produced similar switching between mirror and transparent states. Only a broad reduction feature beginning at −0.8 V, accompanied by a small increase in transmittance is observed before the onset of hydrogen evolution at around −1.0 V, when the film rapidly becomes clear. A small anodic peak centered at −0.6 V, and probably due to hydrogen desorption form the Pd overlayer, signals the onset of the return to the metallic state, a somewhat slower process than hydrogen uptake. The anodic current peaks at −0.3 V, with complete recovery of the mirror-like appearance. The charge passed during the anodic sweep is 61 $mC/cm^2$. The theoretical capacities of Mg and Mg2Ni are 1.38 and 1.24 $mC/nm-cm^2$. Since the Pd layer can account for no more than about 10 $mC/cm^2$, the Ni—Mg capacity is that expected for a 37 to 41 nm thickness, depending on Ni—Mg ratio, consistent with the measured thickness of 50 nm and allowing for some porosity. Switching to the clear state in 40 s and to the mirror state in 90 s could be achieved by stepping the potential to −1.2 V and −0.2 V, respectively.

The presence of $Mg_2NiH_4$ in the transparent films is supported by vibrational spectroscopy. There are raman peaks at about 1650 $cm^{-1}$ and the infrared absorption maximum at 1600 $cm^{-1}$ are attributed to $v_1$ and $v_3$ of the tetrahedral $NiH_4^{4-}$ unit. While all four vibrational modes of a regular tetrahedron are Raman active, the symmetric stretching mode, $v_1$, generally has the highest intensity, and is similar in frequency to the stronger of the two IR absorption modes, $v_3$. No Raman spectrum has been reported for $Mg_2NiH_4$. In the isoelectronic species, $AsH_4^+$ and $GaH_4^-$, $v_1$ appears at 2080 and 1807 $cm^{-1}$, respectively. The stretching frequencies decrease with decreasing charge on the central atom (zero in the case of $NiH_4^{4-}$) and are lowered by hydrogen bonding, which is pronounced in $Mg_2NiH_4$. An infrared absorption at 1638 $cm^{-1}$ has been reported for bulk $Mg_2NiH_4$. The other prominent feature in the infrared spectrum of the hydrided film is a broad absorption centered around 1000 $cm^{-1}$. This peak is stronger relative to that of $Mg_2NiH_4$ (the baseline also varies with Ni:Mg ratio) in regions of the film with higher Mg content, and is assigned to $MgH_2$. All absorption features disappear when hydrogen is removed from the film, and reappear when it is loaded again with hydrogen.

Hydrogen uptake by pure Mg is slow at ambient temperature and is kinetically hindered by formation of a dense surface layer of $MgH_2$. The rate is increased by the presence of nickel or oxide on the Mg surface, or by decreased crystallinity. We observed faster switching in film areas with higher nickel content, and gradual improvement with time and switching cycle, especially in the more Mg-rich regions. The latter may be due to alloying of unreacted Ni and Mg, or to surface oxidation caused by disruption of the Pd coating during cycling. Since no transparent binary hydride of nickel is known, it is clear that a nickel magnesium hydride ($Mg_2NiH_4$) must participate in the switching phenomenon. Formation of $Mg_2NiH_4$ or $MgH_2$ from their metallic precursors results in a volume increase of about 32% in each case. Ni—Mg films on thin glass substrates exhibited significant bending on exposure to hydrogen, while a 1.2 $\mu$m thick film confined on a rigid substrate was found by profilometry to increase in thickness by 31%.

It will be appreciated by those skilled in the art that various modifications and extrapolations can be made in the process, compositions and articles as described herein without departing from the spirit and scope of the invention. All references cited above are hereby incorporated by reference in their entirety into the instant specification.

What is claimed is:

1. A switching device comprising a substrate and a mono-layer film capable of undergoing a reversible change in light transmittance or reflectance, said film comprising a transition metal composition which includes magnesium, said transition metal composition consisting essentially of at least one transition metal chosen from the group consisting of Ti, V, Cr, Mn, Fe, Go, Ni, Cu, Zn, Zr, Nb, Mo, Tc, Ru, Rh, Pd, Ag, Cd, Hf, Ta, W, Re, Os, Ir, Pt, Au and Hg, wherein switching occurs by the formation or decomposition of a hydride.

2. A switching device as claimed in claim 1, wherein the transition metal composition is a metal, an alloy, a hydride or mixture of metals, alloys and/or hydrides.

3. A switching device as claimed in claim 2, wherein the transition metal composition is an alloy of Mg and a transition metal chosen from the group consisting of Ti, V, Cr, Mn, Fe, Co, Ni, Cu and Zn.

4. A switching device as claimed in claim 3, wherein the alloy is $Mg_2Ni$, $Mg_2Fe$ or $Mg_2Co$.

5. A switching device as claimed in claim 1, wherein the transition metal composition is a ternary combination of two transition metals and magnesium.

6. A switching device as claimed in claim 5, wherein the ternary combination comprises magnesium and two metals chosen from the group consisting of Ti, V, Cr, Mn, Fe, Co, Ni, Cu and Zn.

7. A switching device as claimed in claim 6, wherein the film is $Ni_xCo_{1-x}Mg_y$, where $0<x<1$, and $2<y<12$.

8. A switching device as claimed in claim 5, wherein the ternary combination comprises a combination of magnesium and a transition metal alloy chosen from the group consisting of $Fe_xTi_{1-x}$ ($0<x<1$), $V_xTi_{1-x}$ ($0<x<1$), $NiTi_2$, $NiZr_2$, Nb and Ta alloys.

9. A display device incorporating at least one switching device as claimed in claim 1.

10. An optical recording device incorporating at least one switching device as claimed in claim 1.

11. A switching device as claimed in claim 1, characterized in that the film can be reversible switched from a reflective, metallic state to a transparent state.

12. A switching device comprising a substrate and a mono-layer film, said film capable of undergoing a reversible change in light transmittance or reflectance, wherein said film comprises elemental mixtures, alloys, hydrides or solutions of the following systems:

Mn—Mg, Ti—Mg, Cu—Mg, Ni(7 wt % V)-Mg and Fe—Mg, or hydrides of pure Ti or pure V, wherein switching occurs by the formation or decomposition of a hydride.

13. A display device incorporating at least one switching device as claimed in claim 12.

14. An optical recording device incorporating at least one switching device as claimed in claim 12.

* * * * *